United States Patent
Hammarström et al.

(10) Patent No.: US 9,990,551 B2
(45) Date of Patent: Jun. 5, 2018

(54) DRIVER ASSISTANCE SYSTEM AND METHOD FOR A MOTOR VEHICLE

(75) Inventors: Jonas Hammarström, Linkoping (SE); Ognjan Hedberg, Linkoping (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 266 days.

(21) Appl. No.: 14/001,550

(22) PCT Filed: Feb. 24, 2012

(86) PCT No.: PCT/SE2012/050210
§ 371 (c)(1),
(2), (4) Date: Aug. 26, 2013

(87) PCT Pub. No.: WO2012/118427
PCT Pub. Date: Sep. 7, 2012

(65) Prior Publication Data
US 2014/0029803 A1    Jan. 30, 2014

(30) Foreign Application Priority Data
Mar. 1, 2011    (EP) .................................... 11001653

(51) Int. Cl.
*G06K 9/00*    (2006.01)
*B60Q 1/14*    (2006.01)

(52) U.S. Cl.
CPC ....... *G06K 9/00825* (2013.01); *B60Q 1/1423* (2013.01); *B60Q 2300/42* (2013.01)

(58) Field of Classification Search
CPC .............. B60Q 1/1423; B60Q 2300/42; G06K 9/00825; G06T 2207/30236; G06T 2207/30252; G06T 2207/30261
See application file for complete search history.

(56) References Cited

U.S. PATENT DOCUMENTS

| | | | | |
|---|---|---|---|---|
| 7,839,303 B2* | 11/2010 | Kumon et al. | ................. | 340/937 |
| 2004/0008110 A1* | 1/2004 | Stam | ..................... | B60Q 1/085 340/469 |
| 2007/0211482 A1 | 9/2007 | Rebut | | |

(Continued)

FOREIGN PATENT DOCUMENTS

| | | | |
|---|---|---|---|
| DE | 10 2008 059 630 A1 | 6/2010 | |
| EP | 1 837 803 A2 | 9/2007 | |
| JP | 2011037342 A * | 2/2011 | ............... B60Q 1/14 |

OTHER PUBLICATIONS

EPO Machine Translation of JP2011-037342 A.*

(Continued)

*Primary Examiner* — Katrina Fujita
(74) *Attorney, Agent, or Firm* — Brinks Gilson & Lione

(57) ABSTRACT

A driver assistance system (10) for a motor vehicle comprises an imaging means (11) for acquiring images from a surrounding of the motor vehicle, and a processing means (14) adapted to perform image processing of images (30) recorded by the imaging means (11) and to detect an oncoming vehicle (33) by identifying its head lights (34) as a result of the image processing. The processing means (14) is adapted to detect, in the recorded images (30), a light aura (37) originating from at least one light source (34) hidden to the imaging means (11), and to use the light aura detection in the oncoming vehicle detection.

17 Claims, 2 Drawing Sheets

(56) References Cited

U.S. PATENT DOCUMENTS

| | | | |
|---|---|---|---|
| 2007/0221822 A1* | 9/2007 | Stein | B60Q 1/143 |
| | | | 250/205 |
| 2009/0021581 A1* | 1/2009 | Sun | G06K 9/00825 |
| | | | 348/148 |
| 2011/0228089 A1* | 9/2011 | Almeida | 348/148 |

OTHER PUBLICATIONS

PCT International Search Report—dated Jun. 21, 2012.
P.F. Alcantarilla, et al.—Night Time Vehicle Detection for Driving Assistance LightBeam Controller—2008 IEEE Intelligent Vehicles Symposium, Jun. 4-6, 2008, pp. 291-296; Sections II. D, III. C.

* cited by examiner

DRIVER ASSISTANCE SYSTEM AND METHOD FOR A MOTOR VEHICLE

CROSS-REFERENCE TO RELATED APPLICATION

This application claims priority to European Patent Application No. 11001653.2, filed Mar. 1, 2011 and PCT/SE2012/050210, filed Feb. 24, 2012.

FIELD OF THE INVENTION

The invention relates to a driver assistance system for a motor vehicle of a type having an imaging means for acquiring images from a surrounding of the motor vehicle, and a processing means adapted to perform image processing of images recorded by the imaging means and to detect an oncoming vehicle by identifying its head lights as a result of the image processing. The invention also relates to a corresponding driver assistance method.

BACKGROUND

A high beam control system is known having an imaging means, for example a mono camera, adapted to detect and track bright spots in the recorded images originating from the headlights of oncoming vehicles in a detection range of typically 300 m to 1000 m. If detected bright spots are assigned to an oncoming vehicle, a high beam control device is operated to switch off the high beam lights, or to adapt the shape of the high beam light cone, in order to avoid dazzling of the oncoming driver. However, at least for the period of time in which the headlight detection takes place, dazzling of the oncoming driver cannot be avoided. Furthermore, if the oncoming vehicle is hidden to the imaging means until a relatively short distance, for example behind an obstacle like a hill, trees, structures or because of a sharp turn, a sufficiently early detection of the oncoming vehicle can be difficult and the dazzling of the oncoming driver may not be avoided. Generally it is desirable to detect oncoming vehicles as early as possible, for example already at large distances beyond 1000 m, allowing a reaction at a time where the dazzling effect is still small.

SUMMARY

The object of the present invention is to provide a driver assistance system capable of detecting oncoming vehicles at large distances and/or hidden to the imaging means by an obstacle.

The invention solves this object with the features described herein. The invention has realized that at low-light environmental conditions, especially at night, the headlights of an oncoming vehicle create a characteristic indirect illumination, or aura, in the recorded images which is perceivable to the imaging system even if the headlights are not yet directly visible, for example because the oncoming vehicle is still hidden by an obstacle like a hill or trees, or hidden behind a turn. This enables the detection of an oncoming vehicle some time before the headlights of the oncoming vehicle are directly visible, therefore dazzling of the driver can be essentially completely avoided. This is particularly useful if the oncoming vehicle is hidden to the imaging means until relatively short distances at which dazzling of the oncoming driver can become dangerous.

The above mentioned indirect light phenomenon, or aura, is caused by scattering of light rays from the headlights of an oncoming vehicle in the air. An aura is a relatively large and relatively homogenously illuminated area with typical characteristics. Therefore, a detected light object advantageously is assigned to an oncoming vehicle if it fulfils one or more conditions related to the above mentioned typical characteristics of an aura. Among these conditions are one or more of the following: that the light aura approximately has a form of a segment of an oval or a circle; the light aura approximately has a form of a simple oval segment standing on its base; the light aura has a radial light intensity distribution, in particular radially decreasing from a (virtual) center; the light aura has a light intensity generally decreasing from bottom to top; and the light aura is arranged above the ground in the air.

In case a light aura is detected and assigned to an oncoming vehicle, the processing means is advantageously adapted to carry out a suited reaction. For example, a high beam control device may preferably be operated based on the detection of an oncoming vehicle. In particular, the high beam lights may be controlled to be switched off, or to adapt the shape of the high beam light cone, in order to avoid dazzling of the oncoming driver. However, usually there is no need to immediately switch off or adapt the high beam lights as soon as an aura is detected and assigned to an oncoming vehicle, since as long as the other vehicle is not directly visible, the oncoming driver is not dazzled and the high beam lights can advantageously be used for some more time.

In a preferred embodiment, when a light aura is detected and assigned to an oncoming vehicle, the oncoming vehicle is preferably pre-marked and the processing means is preferably set to a confirmation modus. In the confirmation modus the processing means searches for the headlights of the oncoming vehicle by conventional means, for example bright spot detection. Advantageously this search can be confined to a region of interest around the calculated center of the detected aura. Furthermore, the aura is preferably tracked after its detection and the region of interest is accordingly updated. If the aura permanently disappears for some reason, for example in case the oncoming vehicle changes direction, the confirmation mode is terminated. If, however, the headlights of the oncoming vehicle are detected near the calculated center of the aura, a high beam control device may then be operated and in particular, the high beam lights may be controlled to be switched off, or the shape of the high beam light cone may be adapted, in order to avoid dazzling of the oncoming driver.

Preferably the processing means is adapted to take into particular account a region immediately above the ground because in this region the contribution from the headlights of the own car has shown to be small.

BRIEF DESCRIPTION OF THE DRAWINGS

In the following the invention shall be illustrated on the basis of preferred embodiments with reference to the accompanying drawings, wherein.

DETAILED DESCRIPTION

Figure 1:
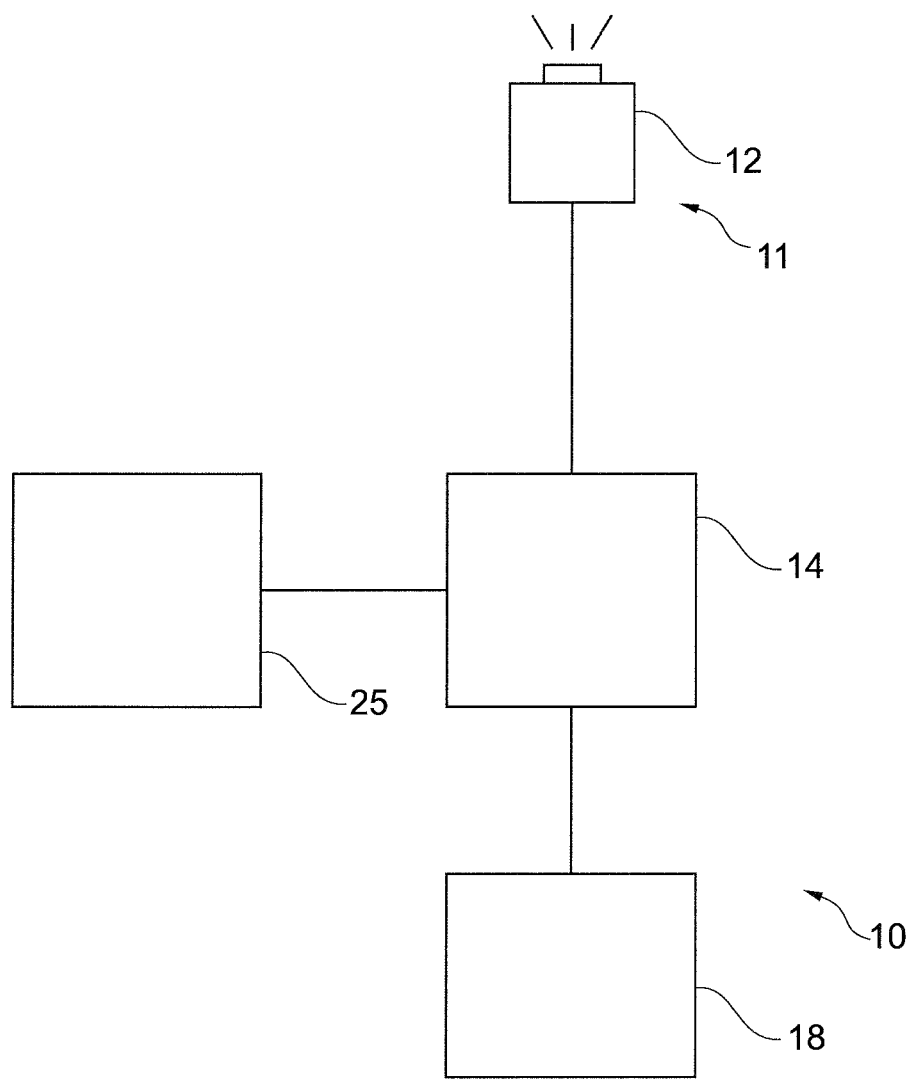
FIG. 1 shows a schematic view of a driver assistance system according to the invention.

The driver assistance system 10, in particular a high beam assistance system, is mounted in a motor vehicle and includes an imaging means 11 for acquiring images of a region outside the motor vehicle, for example a region in front of the motor vehicle. Preferably the imaging means 11 includes at least one optical imaging device 12, in particular a camera, operative in particular in the visible range which may include the near infrared with wavelengths below 5 microns. In a preferred embodiment the imaging device 12 comprises a mono camera, in particular a CMOS or CCD camera, which may, in the current application, be focusable or focused to a distance range from 300 m to infinity. The imaging device 12 may for example be mounted in or near the rear view mirror of the vehicle, without being restricted to this particular arrangement. Alternatively or in addition, the imaging device 12 may comprise a stereo camera system. In this case, expediently a stereo camera system adapted for pedestrian detection in a range below 300 m may be used.

The image data is provided to an electronic processing means 14 where image and data processing is carried out by corresponding software. In particular, the processing means 14 preferably comprises a headlight detection means adapted to detect, by image processing of the image data provided by the imaging means 11, in particular by said imaging device 12 for high beam assistance, the headlights of an oncoming vehicle typically in the distance range between 300 m and 1000 m. The headlight detection may in particular be based on the detection and tracking of bright spots, originating from the head lights of the oncoming vehicle, in the recorded images, as is known from other high beam assistant systems. In such cases, there is a condition in which the headlight of the oncoming vehicle is directly visible to or observable by the imaging means 11 (i.e. there is a direct clear line-of-sight between the oncoming vehicle headlight and the imager). The headlight detection means is adapted to switch off the high beam of the own vehicle, or to adapt the shape of the high beam light cone, automatically as soon as an oncoming vehicle is detected, and to switch the high beam on again, or to re-set the shape of the high beam light cone, automatically if the oncoming vehicle is no longer visible.

The electronic processing means 14 is preferably programmed or programmable and expediently comprises a microprocessor or micro-controller. The electronic processing means 14 can preferably be realized in a digital signal processor (DSP). The electronic processing means 14 and an associated memory means 25 are preferably realised in an on-board electronic control unit (ECU) and may be connected to the imaging means 11 via a separate cable or a vehicle data bus. In another embodiment the ECU and the imaging device 12 can be integrated into a single unit. All steps from imaging, image processing, to activation or control of driver assistance means 18 are performed automatically and continuously during driving in real time.

The processing means 14 comprises an aura detection means adapted to detect, by image processing of the image data provided by the imaging means 11, in particular by the imaging device 12 for high beam assistance, a light aura originating from the headlights of an oncoming vehicle typically in the distance range between 300 m to infinity, i.e., in particular also beyond distances of 1000 m. The aura detection shall be explained in the following on the basis of FIGS. 2 and 3.

Figure 2:
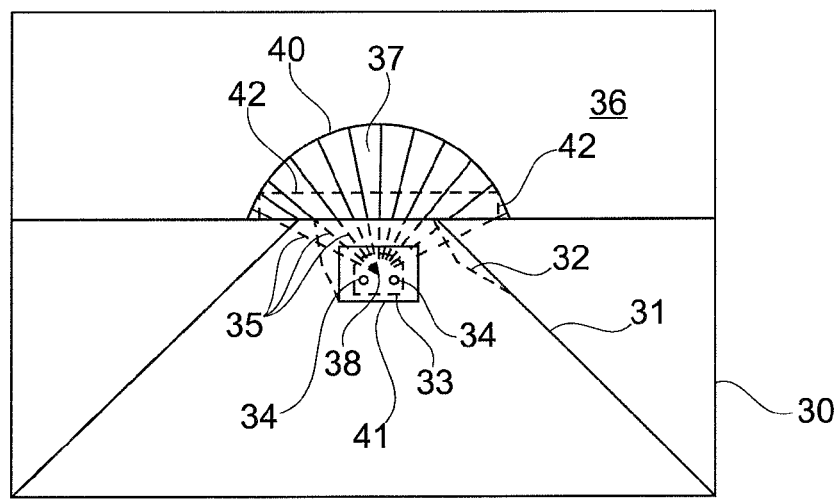
FIG. 2 shows an exemplary image recorded by the imaging means of driver assistance system shown in FIG. 1.

FIG. 2 shows an image 30 recorded by the imaging device 12 in the case of a hilly environment. The road 31 in front of the motor vehicle ascends to the top of a hill and descends again behind the top of the hill as is denoted by dashed lines 32. On the other side of the hill an oncoming vehicle 33 is approaching. The headlights 34 of the oncoming vehicle 33 are still not visible to the imaging device 12 due to the shadowing by the hill. In other words, the headlights 34 are not directly visible to or observable by the imaging device 12 (there being no clear line-of-sight between them). However, the light rays 35 originating from the headlights 34 of the oncoming vehicle 33 are scattered in the air 36 above the hill and lead to a characteristic indirect light phenomenon or visual object 37 called a light aura.

The light aura 37 has certain characteristics which allow the processing means to identify it as such and as originating from the headlights 34 of an oncoming vehicle 33. In particular, the aura 37 has an approximately radial intensity distribution with a relatively homogenous, radial light intensity distribution monotonically decreasing from its (virtual) centre 38, lying approximately in the center of the headlights 34 which generate the aura 37, to the periphery. Because the oncoming vehicle 33 from which the aura 37 emerges is arranged on the ground, the light aura 37 generally has a light intensity decreasing from the ground to the sky, or from the bottom to the top in the recorded images. Through this feature, for example, the light aura 37 of an oncoming vehicle 33 can be distinguished from the aura of a street light shining from above, where the light intensity decreases from the top to the bottom. Furthermore, as can also be seen in FIGS. 2 and 3, the light aura is usually arranged above the ground in the air 36.

Figure 3:
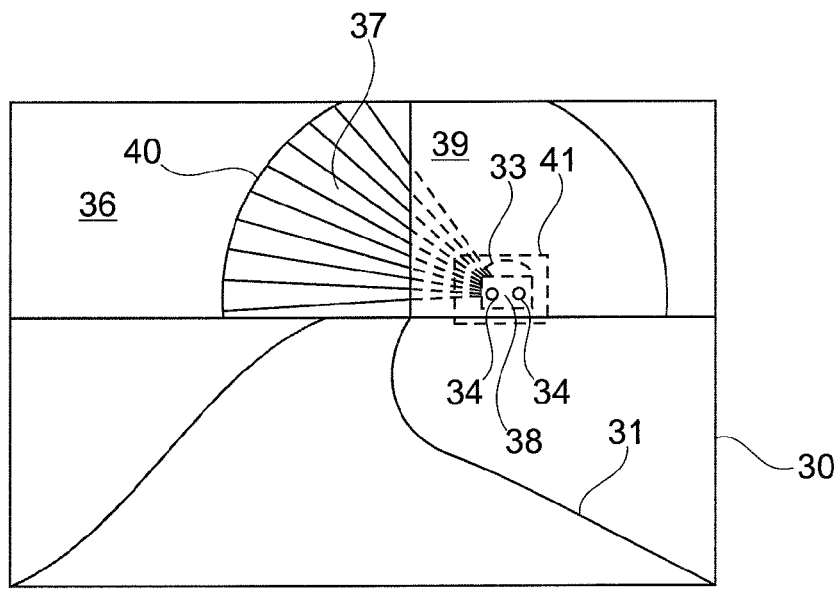
FIG. 3 shows another exemplary image recorded by the imaging means of driver assistance system shown in FIG. 1.

FIG. 3 shows another situation where the oncoming vehicle 33 is hidden behind an obstacle 39 like a building, trees, a hill or the like.

The form of the light aura 37 is generally a segment of an oval or circle. The form of the light aura 37 may be defined by an imaginary line of constant light intensity. For example line 40 in FIG. 2 may indicate a line where the light intensity is one third of the brightest light intensity in the aura. As seen in FIG. 2, in many cases the light aura 37 approximately has a form of a simple segment of an oval, having one cut line or base, where the oval segment is usually standing on its base. However, as is evident from FIG. 3 this is not necessarily the case. In general the form of the light aura may be any part of an oval, ellipse or circle. FIG. 3 also shows that a small part of the aura near the ground may have a slightly decreasing intensity from top to bottom, contrary to the average of the light rays.

When a light aura 37 is detected and assigned to an oncoming vehicle 33, the oncoming vehicle 33 is preferably pre-marked and the processing means 14 is set to a confirmation modus. In the confirmation modus the processing means 14 searches for the headlights 34 of the oncoming vehicle 33 by conventional means, for example bright spot detection. Advantageously this search can be confined to a region of interest 41 around the calculated center 38 of the detected aura. Because the intensity distribution of the light aura is known to be radial, the (virtual) center 38 of the aura 37 lying approximately in the center of the one or more light sources 34 which generate the aura 37 can be easily calculated by the processing means 14. The processing means 14 preferably comprises a tracking means adapted to track over time the center 38 of the light aura. At any time for example a rectangular region-of-interest 41 may advantageously be arranged around the center 38 of the aura 37 and the region of interest may be monitored by the above mentioned headlight detection means based for example on bright spot detection. As soon as the oncoming vehicle 33 emerges behind the obstacle 39 or the hill, its headlights 34 can immediately be detected in the region of interest 41. The headlight detection is advantageously used as a confirmation of the oncoming vehicle detection.

Suitable measures may be taken after the aura 37 has been detected and/or after the headlights 34 of the oncoming vehicle 33 are directly detected. In particular, after the aura 37 has been detected and/or the oncoming vehicle is still relatively far away, for example around 1000 m or so, the high beams of the own vehicle may automatically be controlled by the processing means 14 through the driver assist means 18 in the form of the high beam control device such that the shape of the high beam cones is suitably adapted, in particular directing the high beam cone sideways. If the oncoming vehicle approaches to a closer distance of for example 300 m, the high beams of the own vehicle may automatically be controlled by the processing means 14 through a high beam control device 18 to be turned off.

Other driver assistance means 18 may be controlled depending on the output from the oncoming vehicle detection means in the processing means 14 which may be in the form of: a warning means adapted to provide a collision warning to the driver by suitable optical, acoustical and/or haptical warning signals; one or more restraint systems such as occupant airbags or safety belt tensioners, pedestrian airbags, hood lifters and the like; and/or dynamic vehicle control systems such as brakes or steering means.

In a situation as shown in FIG. 2, special consideration may preferably be given to a region 42 immediately above the ground where the contribution from the headlights of the own car has shown to be small. This may for example be done by performing a separate light intensity check in the region 42, or by giving the contribution of this region 42 to the light aura 37 a higher weight than the contribution of other regions.

While the above description constitutes the preferred embodiment of the present invention, it will be appreciated that the invention is susceptible to modification, variation and change without departing from the proper scope and fair meaning of the accompanying claims.

The invention claimed is:

1. A driver assistance system for a motor vehicle, comprising an imaging means for acquiring images from a surrounding of the motor vehicle, a processing means for performing image processing of images acquired by the imaging means and for detecting an oncoming vehicle by identifying at least one light source of the oncoming vehicle as a result of the image processing, the processing means is further adapted for detecting, in the acquired images, a light aura originating from the at least one light source in a case in which the at least one light source and an origin of the aura is hidden from direct visibility by the imaging means and blocked from view, and to use the light aura detection in the detecting an oncoming vehicle, wherein the light aura is detected at a location above the ground.

2. The driver assistance system as claimed in claim 1, wherein the processing means is adapted for assigning the light aura to the oncoming vehicle if the light aura fulfills at least one condition.

3. The driver assistance system as claimed in claim 2, wherein the at least one condition is that the light aura has a radial light intensity distribution.

4. The driver assistance system as claimed in claim 2 wherein the at least one condition is that the light aura has a light intensity distribution radially decreasing from a center.

5. The driver assistance system as claimed in claim 2 wherein the at least one condition is that the light aura approximately has a form of a segment of an oval or circle.

6. The driver assistance system as claimed in claim 2 wherein the at least one condition is that the light aura approximately has a form of a simple oval segment standing on a base.

7. The driver assistance system as claimed in claim 2 wherein the at least one condition is that the light aura has a light intensity generally decreasing from a bottom to a top.

8. The driver assistance system as claimed in claim 2 wherein the at least one condition is that the light aura is arranged above the ground in the air.

9. The driver assistance system as claimed in claim 1 wherein a high beam control device is operated based on the detecting of an oncoming vehicle.

10. The driver assistance system as claimed in claim 1 wherein the aura is tracked in a plurality of image frames recorded by the imaging means.

11. The driver assistance system as claimed in claim 1 wherein the detecting of an oncoming vehicle is confirmed by a subsequent step of identifying the at least one light source in the form of head lights of the oncoming vehicle.

12. The driver assistance system as claimed in claim 11, wherein the step of identifying the head lights of an oncoming vehicle is based on detecting bright spots in recorded images acquired by the imaging means originating from the head lights.

13. The driver assistance system as claimed in claim 1 wherein the processing means is adapted for confirming that the light aura is present in a region immediately above the ground.

14. The driver assistance system as claimed in claim 1 wherein the imaging means comprises an imaging device for a high beam assistance function for the motor vehicle focusable to distances beyond 300 m.

15. A driver assistance system as claimed in claim 1 further comprising the aura formed by light scattered in air.

16. The driver assistance system as claimed in claim 1 wherein the imaging means comprises an imaging device for a high beam assistance function for the motor vehicle focusable to distances beyond 500 m.

17. A driver assistance method for a motor vehicle, comprising acquiring images from a surrounding of the motor vehicle via an imaging means, performing image processing of the acquired images, and detecting an oncoming vehicle by identifying head lights of the oncoming vehicle as a result of the image processing, by detecting a light aura, originating from the head light, in the acquired images, and using the light aura detection in the oncoming vehicle detection;

wherein the step of detecting occurs when the headlight and an origin of the aura is not directly observable and is blocked from view;

wherein the light aura is detected at a location above the ground.

* * * * *